(12) United States Patent
Sasage et al.

(10) Patent No.: US 8,418,795 B2
(45) Date of Patent: Apr. 16, 2013

(54) SADDLE-RIDE ELECTRIC VEHICLE

(75) Inventors: Taiki Sasage, Saitama (JP); Masahiko Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 812 days.

(21) Appl. No.: 12/552,149

(22) Filed: Sep. 1, 2009

(65) Prior Publication Data
US 2010/0078246 A1    Apr. 1, 2010

(30) Foreign Application Priority Data

Sep. 30, 2008  (JP) ................. 2008-254759
Sep. 30, 2008  (JP) ................. 2008-254760

(51) Int. Cl.
B62K 11/00        (2006.01)
B62M 7/00         (2010.01)

(52) U.S. Cl.
USPC ........................... 180/220; 180/65.1

(58) Field of Classification Search ............ 180/65.1, 180/205.1, 206.1, 206.5, 206.6, 219, 220
See application file for complete search history.

(56) References Cited

U.S. PATENT DOCUMENTS

| | | | |
|---|---|---|---|
| 5,421,427 A * | 6/1995 | Ogawa et al. ............. | 180/220 |
| 5,613,569 A | 3/1997 | Sugioka et al. | |
| 6,679,345 B2 * | 1/2004 | Hirayama et al. ........ | 180/65.31 |
| 7,121,366 B2 * | 10/2006 | Horii ........................ | 180/65.1 |
| 7,210,550 B2 * | 5/2007 | Yonehana et al. ........ | 180/220 |
| 7,264,073 B2 * | 9/2007 | Nakagawa et al. ....... | 180/68.5 |
| 7,267,190 B2 | 9/2007 | Hirano | |
| 2002/0046891 A1 * | 4/2002 | Honda et al. ............. | 180/220 |
| 2003/0213632 A1 | 11/2003 | Schless | |
| 2005/0092538 A1 * | 5/2005 | Baldwin et al. ........... | 180/220 |
| 2005/0155802 A1 | 7/2005 | Hirano | |
| 2006/0000655 A1 * | 1/2006 | Schless ..................... | 180/220 |

FOREIGN PATENT DOCUMENTS

| | | |
|---|---|---|
| CN | 1640756 A | 7/2005 |
| FR | 2865183 A1 | 7/2005 |
| GB | 2307218 A | 5/1997 |
| JP | 2003-182669 A | 7/2003 |

* cited by examiner

*Primary Examiner* — Kevin Hurley
*Assistant Examiner* — Marc A Scharich
(74) *Attorney, Agent, or Firm* — Birch, Stewart, Kolasch & Birch, LLP

(57) ABSTRACT

In a saddle-ride electric vehicle equipped with an electric motor generating power for rotatively driving a rear wheel, a main battery supplying electric power to the electric motor is disposed in a first space S1 that is surrounded by a down frame connected to a head pipe or a front end portion of a main frame and extending downward, a pivot frame connected to the rear end portion of the main frame and extending downward, and the main frame, and a sub-battery that can supply electric power to the electric motor instead of the main battery is disposed in a second space S2 surrounded by seat rails connected to the rear portion of the main frame to support an occupant seat and the main frame. The electric motor is disposed at a position different from the first and second spaces S1 and S2.

16 Claims, 6 Drawing Sheets

SADDLE-RIDE ELECTRIC VEHICLE

CROSS-REFERENCE TO RELATED APPLICATION

The present application claims priority under 35 U.S.C. §119 to Japanese Patent Application Nos. 2008-254759 and 2008-254760 both filed on Sep. 30, 2008, the entire contents of which are hereby incorporated by reference.

BACKGROUND OF THE INVENTION

1. Field of the Invention

The present invention relates to a saddle-ride electric vehicle equipped with, a head pipe steerably supporting a front fork with a front wheel journaled to a lower end portion and a steering handlebar, a main frame extending downward and rearward from the head pipe, and an electric motor generating power for rotatively driving a rear wheel.

2. Description of the Related Art

A motorcycle equipped with a battery, which supplies electric power to an electric motor, under a main frame extending downward and rearward from a head pipe has been disclosed in JP-A No. 2003-182669.

However, in the motorcycle disclosed in JP-A No. 2003-182669, a motor unit having an electric motor generating power for rotatively driving the rear wheel is attached between the lower portion of a front bracket hung from a main frame and the lower portion of a pivot frame extending downward from the rear end of the main frame, and a battery is disposed in a narrow space between the motor unit and the main frame, such that it is difficult to dispose a larger battery.

SUMMARY OF THE INVENTION

The present invention is designed in consideration of the above problem and it is an object to provide a saddle-ride electric vehicle that can be compactly equipped with a spare battery, in addition to a larger battery.

In order to achieve the above object, according to a first feature of the present invention, there is provided a saddle-ride electric vehicle that includes a head pipe steerably supporting a front fork with a front wheel journaled to a lower end portion and a steering handlebar, a main frame extending downward and rearward from the head pipe, and an electric motor generating power for rotatively driving a rear wheel, in which a main battery supplying electric power to the electric motor is disposed in a first space that is surrounded by a down frame connected to the head pipe or a front end portion of the main frame and extending downward, a pivot frame connected to a rear end portion of the main frame and extending downward, and the main frame, a sub-battery that can supply electric power to the electric motor instead of the main battery is disposed in a second space that is surrounded by a seat rail connected to a rear end portion of the main frame to support an occupant seat and the main frame, and the electric motor is disposed at a position different from the first and second spaces.

Based on the structural arrangement of the first feature, the first space surrounded by the main frame, the down frame, and the pivot frame and the second space surrounded by the seat rails and the main frame are increased by disposing the electric motor at a position different from the spaces. Further, by disposing the main battery and the sub-battery in the increased first and second spaces, it is possible to dispose a larger battery. In addition, when the main battery is discharged, it is possible to supply electric power to the electric motor from the sub-battery, instead of the main battery.

According to a second feature of the present invention, in addition to the first feature, a front end portion of a swing arm with the rear wheel journaled to a rear end portion is connected swingably up/down to the pivot frame and the electric motor is disposed, with a rotational axis arranged coaxially with the rear wheel, at a rear end portion of the swing arm.

Based on the structural arrangement of the second feature, since the electric motor is attached coaxially with the rear wheel, to the rear end portion of the swing arm, it is possible to compactly dispose the electric motor while ensuring installation space for the main battery and the sub-battery.

According to a third feature of the present invention, in addition to the first feature or the second feature, a plurality of cells for a main battery, which is combined with each other to form the main battery, is aligningly arranged in a main battery box having an upper surface substantially corresponding to the main frame and disposed in the first space, corresponding to a shape of the main battery box, and a plurality of cells for a sub-battery, which is combined with each other to form the sub-battery, is aligningly arranged in a sub-battery box formed to correspond to the second space and disposed in the second space, corresponding to a shape of the sub-battery box.

Based on the structural arrangement of the third feature, the plurality of cells for the main battery, which is combined with each other to form the main battery, is aligningly arranged in the main battery box, corresponding to the shape of the main battery box, and the plurality of cells for the sub-battery, which is combined with each other to form the sub-battery, is aligningly arranged in the sub-battery box, corresponding to the shape of the sub-battery box. Accordingly, more battery cells can be accommodated in the main battery and sub-battery boxes.

According to a fourth feature of the present invention, in addition to the third feature, a lower frame, which is selectable between a connection state that connects the down frame with the pivot frame and a disconnection state that allows the main battery box to be drawn out downward by cutting the connection, is disposed between lower portions of the down frame and the pivot frame.

Based on the structural arrangement of the fourth feature, in the disconnection state of the lower frame, it is possible to draw out the main battery box downward, such that maintenance of the main battery is facilitated.

According to a fifth feature of the present invention, in addition to the first feature, a first cooling fan that sucks air heated by the main battery to a rear side of the first space and discharges the air rearward of an occupant seat is supported by the vehicle body frame having the heat pipe, the main frame, the down frame and the pivot frame. Based on the structural arrangement of the fifth feature, it is possible to discharge heat generated by the main battery rearward of the occupant seat.

According to a sixth feature of the present invention, in addition to the fifth feature, the main battery box, which is formed such that traveling air coming from a front area of the vehicle can be introduced from the front and discharged from a rear upper portion, is disposed in the first space, and the main battery is accommodated in the main battery box. Based on the structural arrangement of the sixth feature, it is possible to effectively discharge air in the main battery box and effectively cool the main battery in the main battery box by operating the first cooling fan.

Further, according to a seventh feature of the present invention, according to the fifth feature, a second cooling fan that sucks air heated by the sub-battery from the second space and discharges the air rearward of the occupant seat is supported by the vehicle body frame. Based on the structural arrangement of the seventh feature, it is possible to discharge heat generated by the sub-battery rearward of the occupant seat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
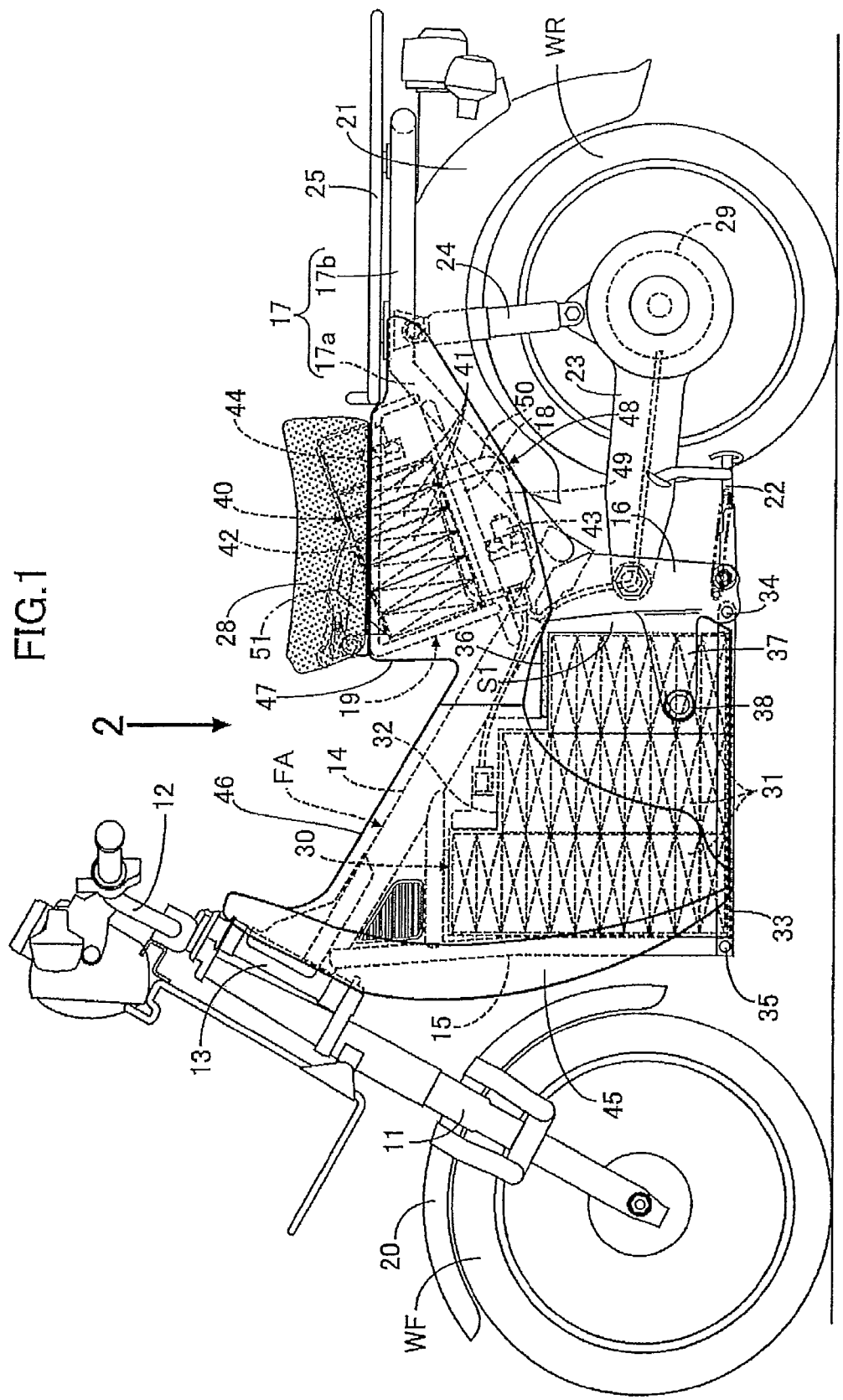
FIG. 1 is a left side view of a motorcycle.

A first embodiment of the present invention will be described with reference to FIGS. 1 to 5. First, in FIG. 1 to 4, a vehicle body frame FA of a motorcycle, which is a saddle-ride electric vehicle, includes a head pipe 13 steerably supporting a front fork 11 with a front wheel WF journaled to a lower end portion and a bar-shaped steering handlebar 12 connected to the upper end portion of the front fork 11, a pipe-shaped main frame 14 extending downward and rearward from the head pipe 13, a pivot frame 16 connected to the rear end portion of the main frame 14 and extending downward, a pair of left and right rear frames 17 connected to the rear end portion of the main frame 14 and extending rearward, and a pair of left and right seat rails 18 disposed between the rear portion of the main frame 14 and the middle portions of both rear frames 17 and inclined upward and rearward.

The rear frames 17 each have inclined portions 17a extending upward and rearward from the rear end portion of the main frame 14 and horizontal portions 17b extending horizontally rearward from the rear ends of the inclined portions 17a, which are integrally formed, and the rear portions of the horizontal portions 17b are connected to each other. Further, the rear ends of the seat rails 18 are connected to the rear upper portions of the inclined portions 17a of the rear frames 17.

A front fender 20 that covers the front wheel WF from above is attached to the front fork 11 and a rear fender 21 that covers the rear wheel WR from above is attached to the rear frames 17. Further, a main stand 22 is rotatably attached to the lower portion of the pivot frame 16. In addition, the front end portion of a swing arm 23 with the rear wheel WR journaled to the rear end portion is connected swingably up/down to the pivot frame 16 and rear cushion units 24 are disposed between the front portions of the horizontal portions 17b of the rear frames 17 and the rear portion of the swing arm 23. Furthermore, a load-carrying platform 25 is disposed on the horizontal portions 17b of the rear frames 17.

Figure 5:
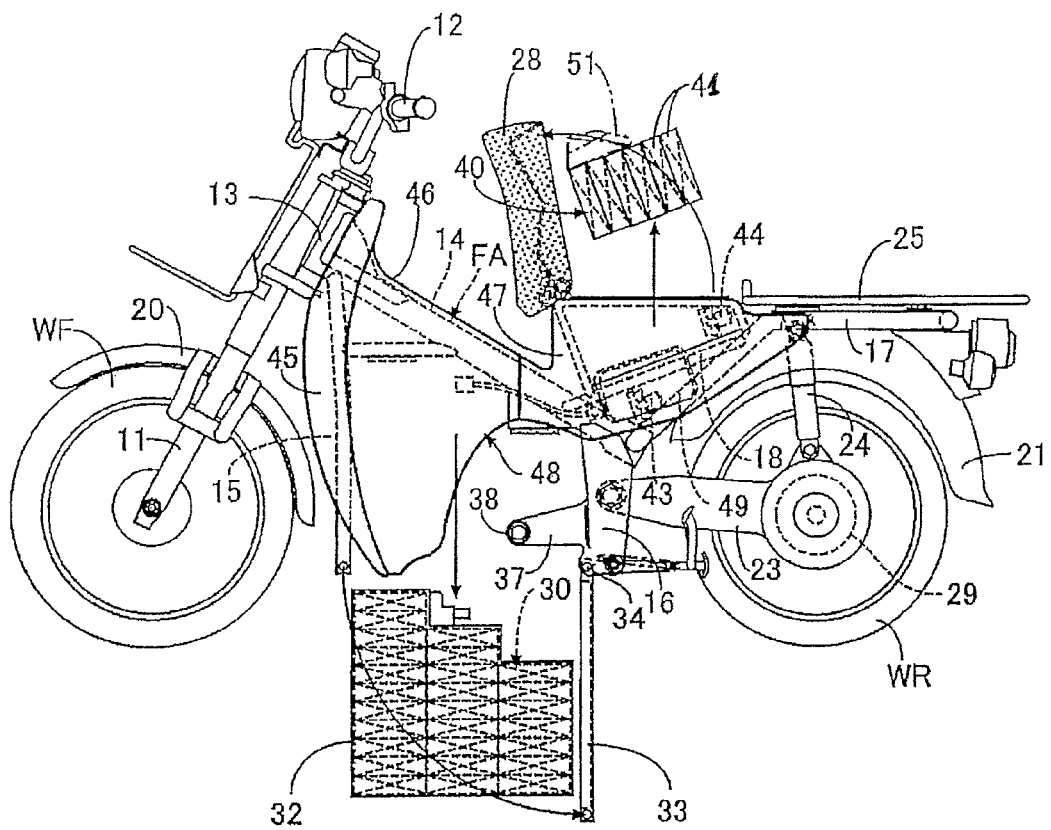
FIG. 5 is a view illustrating attachment and detachment of a battery.

An occupant seat 28 is disposed ahead of the load-carrying platform 25 and supported to the seat rails 18 through a seat support frame 19, such that, as shown in FIG. 5, the occupant seat 28 is supported rotatably forward by the seat support frame 19. Thus, the seat support frame 19 has a horizontal seat support portion 19a supporting the occupant seat 28, a front leg 19b extending downward from the front portion of the seat support portion 19a, and a rear leg 19c extending downward from the rear portion of the seat support portion 19a, in which the lower end of the front leg 19b is fixed to the front portions of the seat rails 18 and the lower end of the rear leg 19c is fixed to the rear portion of the inclined portions 17a of the rear frames 17.

On the other hand, the rear wheel WR is rotatively driven by the power generated by the electric motor 29 and a main battery 30 supplying electric power to the electric motor 29 is disposed in a first space S1 (see FIGS. 1 and 3) which is surrounded by the main frame 14, a down frame 15 that forms a portion of the vehicle body frame FA and is connected to the head pipe 13 or the front end portion of the main frame 14 (the front end portion of the main frame 14 in this embodiment) while extending downward, and the pivot frame 16. On the other hand, the electric motor 29 is disposed at a position different from the first space S1, and in this embodiment, the electric motor 29 is disposed, with the rotational axis arranged coaxially with the rear wheel WR, at the rear end portion of the swing arm 23 behind the first space S1.

The main battery 30 is composed of a plurality of cells 31 for a main battery, which is combined with each other, and each of the cells 31 for a main battery has an upper surface substantially corresponding to the main frame 14 of the vehicle body frame FA and the cells are aligningly arranged in a main battery box 32 disposed in the first space S1 surrounded by the main frame 14, the down frame 15, and the pivot frame 16, corresponding to the shape of the main battery box 32.

Thus, the upper surface of the main battery box 32 is formed to correspond to the lower surface of the main frame 14 extending downward and rearward, and in this embodiment, is formed to be gradually lowered to the rear.

In addition, a lower frame 33, which is selectable between a connection state that supports the main battery box 32 by connecting the down frame 15 with the pivot frame 16 and a disconnection state that allows the main battery box 32 to be drawn out downward by cutting the connection, is disposed between the lower portions of the down frame 15 and the pivot frame 16. In this embodiment, the rear portion of the lower frame 33 is swingably connected to the lower portion of the pivot frame 16 through a spindle 34 and the front portion of the lower frame 33 is detachably connected to the lower portion of the down frame 15 by a detachable connecting pin 35 or the like. That is, the lower frame 33 is selectable between the connection state where the front portion of the lower frame is connected to the down frame 15 and the disconnection state where the front portion of the lower frame is separated from the down frame 15, such that it is possible to draw out downward the main battery box 32 by rotating down the front portion of the lower frame 33 in the disconnection state, as shown in FIG. 5.

Further, elastic members 36 are interposed between the upper surface of the main battery box 32 supported by the lower frame 33, which is in the connection state, and the vehicle body frame FA.

Further, a pair of left and right step-frames 37 that extends forward from the pivot frame 16 is connected to the lower portion of the pivot frame 16, and steps 38 where an occupant sitting on the occupant seat 28 puts the feet are provided at the front ends of the step-frames 37.

Figure 2:
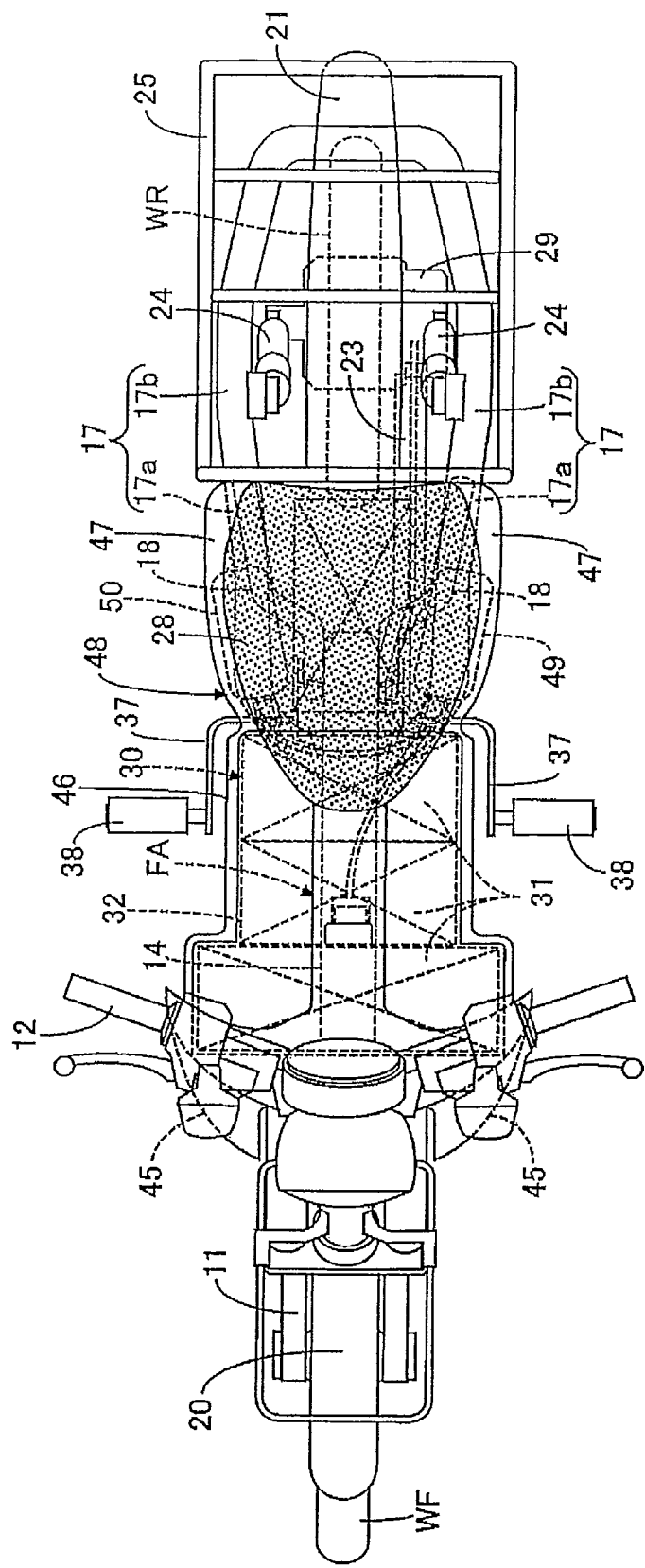
FIG. 2 is a view seen from the direction of an arrow indicated by reference numeral 2 in FIG. 1.
Figure 3:
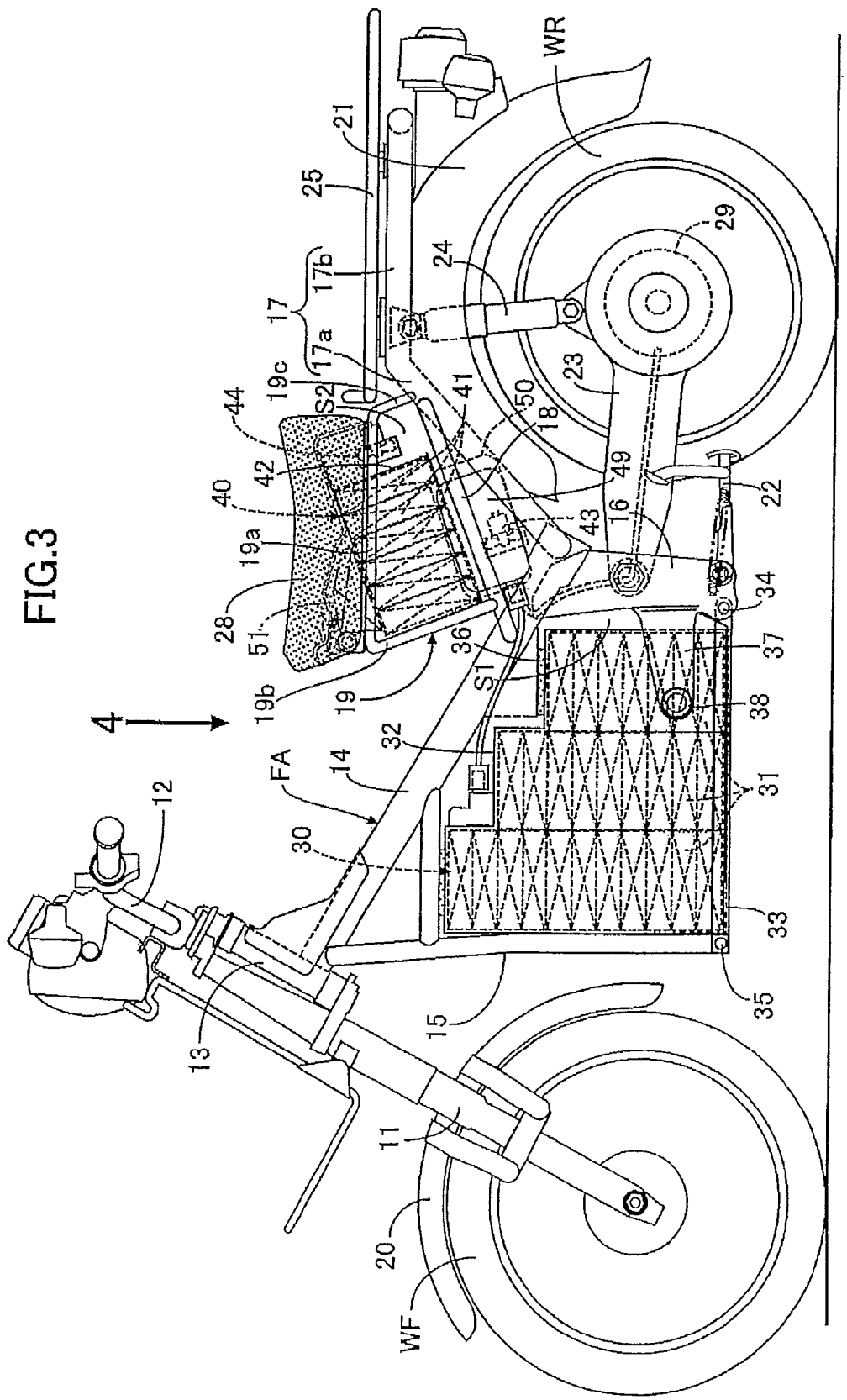
FIG. 3 is a left side view of the motorcycle with a vehicle body cover removed.
Figure 4:
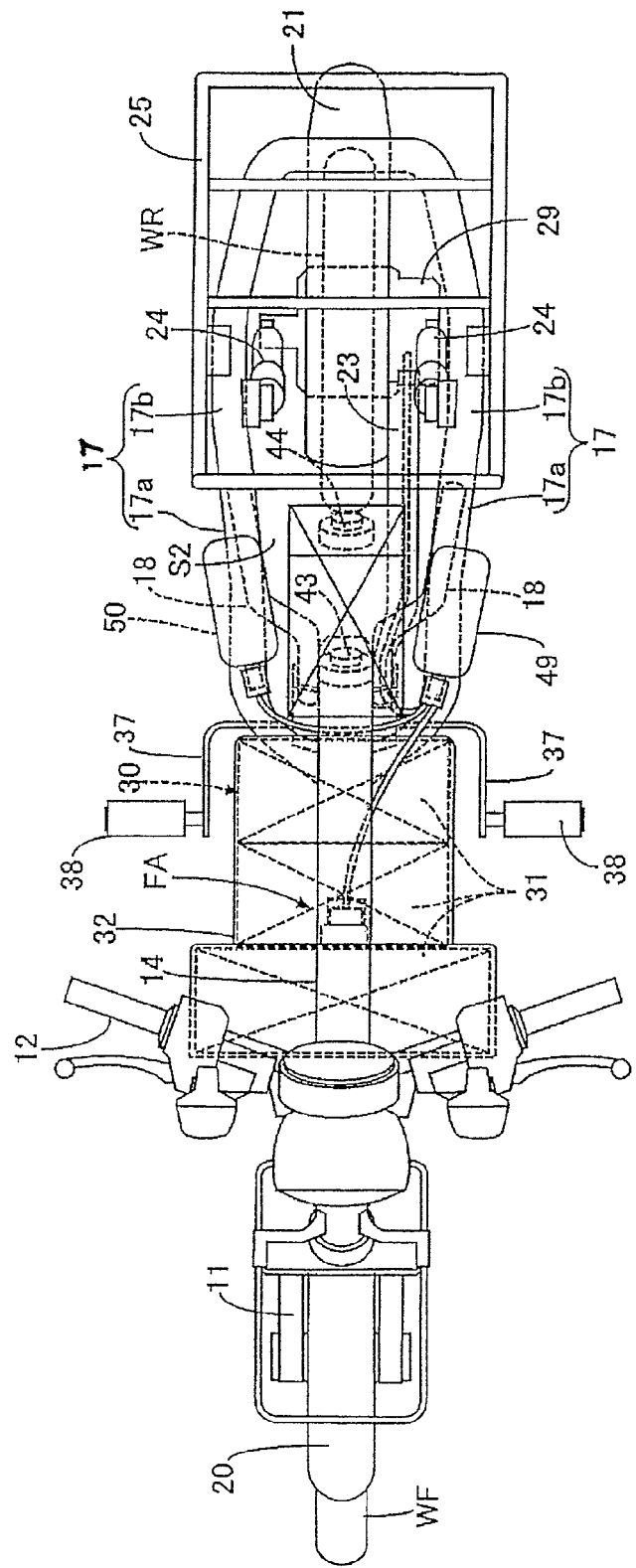
FIG. 4 is a view seen from the direction of an arrow indicated by reference numeral 4 in FIG. 3.

Thus, the main battery box 32 accommodating the main battery 30 does not overlap the step-frames 37 and steps 38 in a plane view, as shown in FIGS. 2 and 4, and in this embodiment, the rear width of the main battery box 32, that is, the main battery 30 is set to be narrower than the width of front portion of the main battery box 32, corresponding to the step-frames 37 and the steps 38 disposed at both rear sides of the main battery box 32. In addition, in order to increase the capacity of the main battery 30, the main battery box 32 is formed to extend rearward such that the rear end portion overlaps the step-frames 37 in a side view.

Further, a sub-battery 40 that can supply electric power to the electric motor 29, instead of the main battery 30, is disposed in a second space S2 surrounded by the main frame 14 and the seat rails 18 and positioned under the occupant seat 28 such that it can be drawn out of the second space S2 with the occupant seat 28 rotated forward, as shown in FIG. 5, and the sub-battery 40 is surrounded by the seat support frame 19. Thus, the electric motor 29, unlike the first space S1, is disposed behind the first space S1 and positioned at the rear end portion of the swing arm 23, such that it is disposed at a different position from the second space S2.

The sub-battery 40 is composed of a plurality of cells 41 for a sub-battery, which is combined with each other, and the cells 41 for a sub-battery are formed to correspond to the second space S2 and aligningly arranged in a sub-battery box 42 disposed in the second space S2, corresponding to the shape of the sub-battery box 42.

A first cooling fan 43 that sucks air heated by the main battery 30 to the rear side of the first space S1 and discharges the air rearward of the occupant seat 28 is supported by the seat rails 18 of the vehicle body frame FA, and the main battery box 32 disposed in the first space S1 is formed such that traveling air coming from the front area of the motorcycle can be introduced from the front and discharged through the rear upper portion.

Further, a second cooling fan 44 that sucks air heated by the sub-battery box 42 disposed in the second space S2 from the second space S2 and discharges the air rearward of the occupant seat 28 is supported by the rear leg 19c of the seat support frame 19 of the vehicle body frame FA.

Meanwhile, both legs of the occupant sitting on the occupant seat 28 are covered by leg shields 45 from the front, and the leg shields 45 are integrally formed with a synthetic resin center cover 46 to cover the front portion of the main battery box 32 from both sides while covering the main frame 14 from above. On the other hand, the seat rails 18, the seat support frame 19, the sub-battery box 42, and the second cooling fan 44 are covered by a pair of left and right synthetic resin side covers 47 disposed under the occupant seat 28, from both sides, and the synthetic resin side covers 47 are connected to the center cover 46 and form a vehicle body cover 48 together with the center cover 46.

In addition, driving circuit means 49 that receives electric power supplied from the main battery 30 and the sub-battery 40 to drive the electric motor 29 is accommodated in one of the side covers 47 and charging circuit means 50 for charging the main battery 30 is accommodated in the other one of the side covers 47. Further, a charging cord 51 is accommodated between the occupant seat 28 and the sub-battery box 42.

The operation of the first embodiment will be described hereafter. Since the main battery 30 supplying electric power to the electric motor 29 generating power for rotatively driving the rear wheel WR is disposed in the first space S1 surrounded by the down frame 15 connected to the front end portion of the main frame 14 and extending downward, the pivot frame 16 connected to the rear end portion of the main frame 14 and extending downward, and the main frame 14, and the electric motor 29 is disposed at a position different from the first space S1, it is possible to dispose the large main battery 30 by increasing the first space S1 to dispose the main battery 30 in the increased first space S1.

Further, since the front end portion of the swing arm 23 with the rear wheel WR journaled to the rear end portion is connected swingably up/down to the pivot arm 16 and the electric motor 29 is disposed with the rotational axis arranged coaxially with the rear wheel WR at the rear end portion of the swing arm 23, it is possible to compactly dispose the electric motor 29 while ensuring an installation space for the main battery 30.

Further, since the lower frame 33, which is selectable between a connection state that supports the main battery box 32 by connecting the down frame 15 with the pivot frame 16 and a disconnection state that allows the main battery box 32 to be drawn out downward by cutting the connection, is disposed between the lower portions of the down frame 15 and the pivot frame 16, in the disconnection state of the lower frame 33, it is possible to draw out the main battery box 32 downward and maintenance of the main battery 30 is facilitated.

Further, the main battery 30 is disposed in the first space S1, whereas the sub-battery 40 that can supply electric power to the electric motor 29 instead of the main battery 30 is disposed in the second space S2, which is surrounded by the rear frames 17 connected to the rear end portion of the main frame 14 and extending upward and rearward, the seat rails 18 supporting the occupant seat 28 while connecting the rear portion of the main frame 14 with the middle portions of the rear frames 17, and the main frame 14, and the electric motor 29 is disposed at a position different from the second space S2. Accordingly, by disposing the main battery 30 and the sub-battery 40 in the first and second spaces S1, S2, which can be formed larger by not disposing the electric motor 29, it is possible to dispose a larger main battery 30 and sub-battery 40 and supply electric power to the electric motor 29 from the sub-battery 40 instead of the main battery 30, when the main battery 30 is discharged.

The main battery 30 is composed of the plurality of cells 31 for a main battery, which is combined with each other, the cells 31 for a main battery have upper surfaces substantially corresponding to the lower surface of the main frame 14 and are arranged in a main battery box 32 disposed in the first space S1 surrounded by the main frame 14, the down frame 15, and the pivot frame 16, corresponding to the shape of the main battery box 32, the sub-battery 40 is composed of the plurality of cells 41 for a sub-battery, which is combined with each other, and the cells 41 for a sub-battery are formed to correspond to the second space S2 and aligningly arranged in a sub-battery box 42 disposed in the second space S2, corresponding to the shape of the sub-battery box 42. Accordingly, it is possible to accommodate more cells 31 for a main battery in the main battery box 32 and accommodate more cells 41 for a sub-battery in the sub-battery box 42.

Further, the side covers 47 covering the seat rails 18 from the sides are disposed under the occupant seat 28 disposed above the seat rails 18 and the driving circuit means 49 receiving electric power supplied from the main battery 30 or the sub-battery 40 and driving the electric motor 29 is accommodated in the side cover 47. Accordingly, the driving circuit means 49 is not seen from the outside and the external appearance can be improved.

In addition, the pair of left and right side covers 47 is disposed at both the left and right sides of the seat rails 18, the driving circuit means 49 is accommodated in one of the side covers 47, and the charging circuit means 50 for charging the main battery 30 is accommodated in the other one of both side covers 47. Accordingly, it is possible to dispose the driving circuit means 49 and the charging circuit means 50 while maintaining good left-right weight balance, effectively using the space inside both side covers 47, and achieving good external appearance.

Further, the first cooling fan 43 that sucks air heated by the main battery 30 to the rear side of the first space S1 and discharges the air rearward of the occupant seat 28 is supported by the seat rails 18 of the vehicle body frame FA and the main battery box 32 disposed in the first space S1 is formed such that traveling air coming from the front area of the motorcycle can be introduced from the front and discharged from the rear upper portion. Accordingly, the heat generated by the main battery 30 can be discharged rearward of the occupant seat 28.

In addition, since the main battery box 32 is formed such that traveling air coming from the front area of the motorcycle can be introduced from the front and discharged from the rear upper portion and the main battery 30 is accommodated in the main battery box 32, it is possible to effectively discharge the air in the main battery box 32 and effectively cool the main battery 30 in the main battery box 32 by operating the first cooling fan 43.

Further, the sub-battery 40 that can supply electric power to the electric motor 29 instead of the main battery is disposed in the second space S2 surrounded by the rear frames 17, the seat rails 18, and the main frame 14, and the second cooling fan 44 that sucks air heated by the sub-battery box 42 from the second space S2 and discharges the air rearward of the occupant seat 28 is supported by the rear leg 19c of the seat support frame 19 of the vehicle body frame FA. Accordingly, it is possible to discharge the heat generated by the sub-battery 40 rearward of the occupant seat 28.

Further, since the main battery 30 and the main battery box 32 are disposed in the first space S1 without overlapping both step-frames 37 and the steps 38 disposed at the front ends of both step-frames 37 in a plane view, it is possible for the occupant to more comfortably put the feet without increasing the width between both step-frames 37. Furthermore, by disposing both step-frames 37 and both steps 38, although the width of the main battery 30 has to be decreased where the occupant strides across the occupant seat 28, the width of the main battery 30 is increased at the portion positioned further forward from both step-frames 37 and both steps 38. Accordingly, it is possible for the occupant to more comfortably put the feet, to considerably increase the capacity of the main battery box 32, and to increase the size of the main battery 30 by accommodating more cells 31 for a main battery in the main battery box 32.

Figure 6:
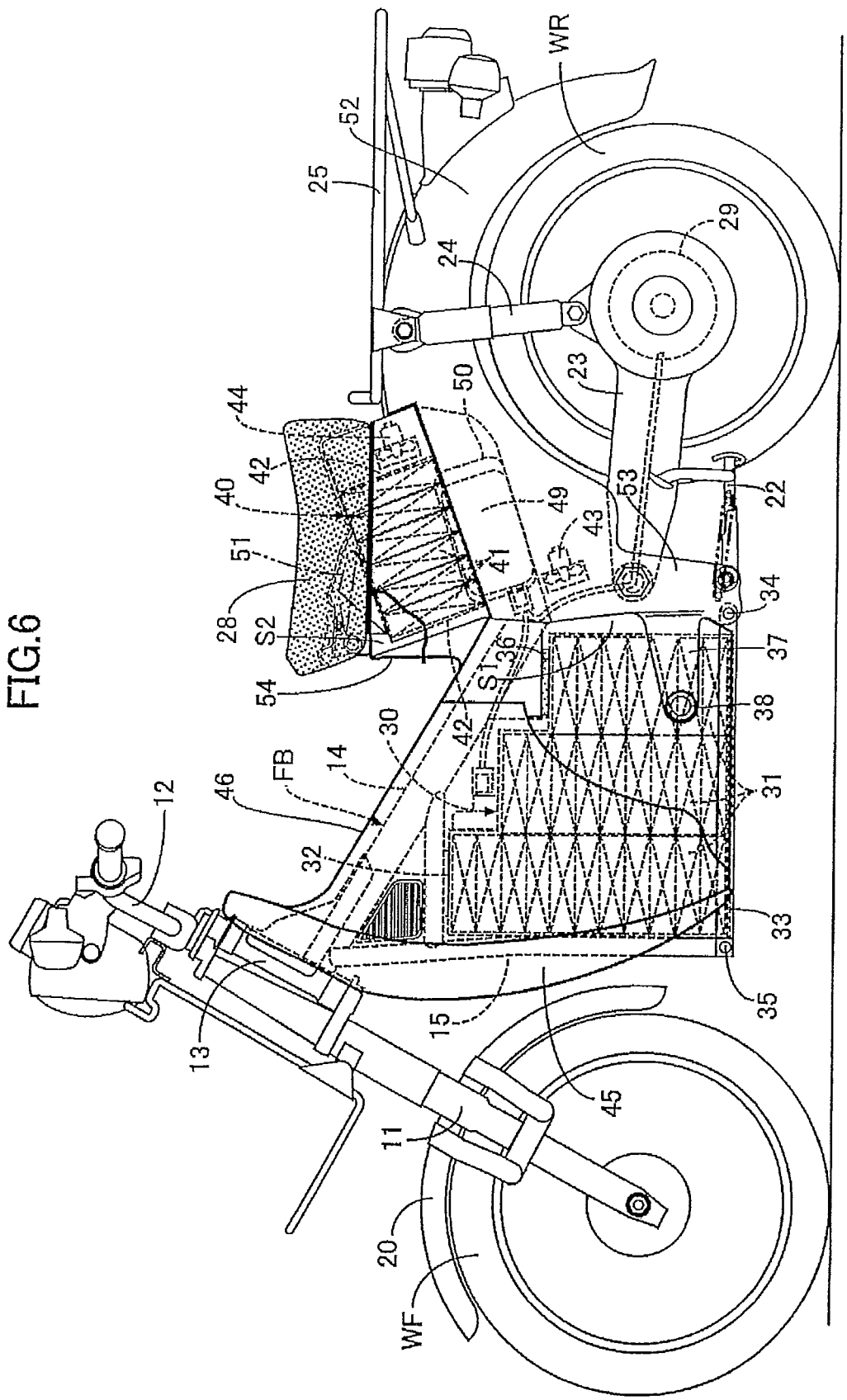
FIG. 6 is a left side view of the motorcycle in a second embodiment of the present invention.

A second embodiment of the present invention will be described with reference to FIG. 6. Parts corresponding to those in the first embodiment are designated by the same reference numerals and detailed description is not provided.

A vehicle body frame FB of a motorcycle includes a head pipe 13 steerably supporting a front fork 11 with a front wheel WF journaled to a lower end portion and a steering handlebar 12, a pipe-shaped main frame 14 extending downward and rearward from the head pipe 13, and a rear frame 52 that is separable to the left and right and is connected to the lower portion of the main frame 14. The rear frame 52 integrally has a pivot frame 53 connected to the rear end of the main frame 14 and extending downward and has functions of a seat rail supporting an occupant seat 28 and a rear fender covering the rear wheel WR from above.

A pair of left and right step-frames 37 that extends forward from the pivot frame 53 is connected to the lower portion of the pivot frame 53 and steps 38 where an occupant sitting on the occupant seat 28 puts the feet are provided at the front ends of the step-frames 37.

The rear wheel WR is journaled to the rear portion of a swing arm 23 swingably supported by the lower portion of the pivot frame 53 and an electric motor 29 generating power for rotatively driving the rear wheel WR is disposed with the rotational axis thereof arranged coaxially with the rear wheel WR.

A main battery 30 supplying electric power to the electric motor 29 is composed of a plurality of cells 31 for a main battery, which is combined with each other, and accommodated in a main battery box 32, and the main battery box 32 is disposed in a first space S1 surrounded by a main frame 14, a down frame 15 connected to the head pipe 13 or the front end portion of the main frame 14 (the front end portion of the main frame 14 in this embodiment) and extending downward, and the pivot frame 53, without overlapping the step-frames 37 and the steps 38 in a plane view, in which the upper surface of the main battery box 32 corresponds to the lower surface of the main frame 14 extending downward and rearward, and is formed to be gradually lowered to the rear.

In addition, a lower frame 33, which is selectable between a connection state that supports the main battery box 32 by connecting the down frame 15 with the pivot frame 53 and a disconnection state that allows the main battery box 32 to be drawn out downward by cutting the connection, is disposed between the lower portions of the down frame 15 and the pivot frame 53. Therefore, since the lower frame 33 is selectable between the connection state where the front portion is connected to the down frame 15 and the disconnection state where the front portion is separated from the down frame 15, it is possible to draw out downward the main battery box 32 by rotating down the front portion of the lower frame 33 in the disconnection state.

Further, a sub-battery 40 that can supply electric power to the electric motor 29, instead of the main battery 30, is disposed in a second space S2 surrounded by the main frame 14 and the rear frame 52 functioning as the seat rails, under the occupant seat 28. The sub-battery 40 is composed of a plurality of cells 41 for a sub-battery, which is combined with each other, and the cells 41 for a sub-battery are formed to correspond to the second space S2 and aligningly arranged in a sub-battery box 42 disposed in the second space S2, corresponding to the shape of the sub-battery box 42.

A first cooling fan 43 that sucks air heated by the main battery 30 to the rear side of the first space S1 and discharges the air rearward of the occupant seat 28 is supported by the rear frame 52 of the vehicle body frame FB, and the main battery box 32 disposed in the first space S1 is formed such that traveling air coming from the front area of the motorcycle can be introduced from the front and discharged from the rear upper portion.

Further, a second cooling fan 44 that sucks air heated by the sub-battery 40 disposed in the second space S2 and discharges the air rearward of the occupant seat 28 is supported by the rear frame 52 of the vehicle body frame FB.

By the way, both left and right legs of the occupant sitting on the occupant seat 28 are covered by leg shields 45 from the front, and the leg shields 45 are integrally formed with a synthetic resin center cover 46 to cover the front portion of the main battery box 32 from both sides while covering the main frame 14 from above. On the other hand, the sub-battery box 42 and the second cooling fan 44 are covered by a pair of left and right synthetic resin side covers 54 disposed under the occupant seat 28, from both sides, and the synthetic resin side covers 54 are connected to the center cover 46 and the rear frame 52.

In addition, driving circuit means 49 that receives electric power supplied from the main battery 30 and the sub-battery 40 and drives the electric motor 29 and charging circuit means 50 for charging the main battery 30 are accommodated inside the rear frame 52.

It is also possible to achieve the same effects as the first embodiment, in the second embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride electric vehicle comprising:
    a head pipe steerably supporting a front fork with a front wheel journaled to a lower end portion of the front fork and a steering handlebar;
    a main frame extending downward and rearward from the head pipe; and
    an electric motor generating power for rotatively driving a rear wheel,
    wherein a main battery supplying electric power to the electric motor is disposed in a first space (S1) that is surrounded by a down frame connected to the head pipe or a front end portion of the main frame and extending downward, a pivot frame connected to a rear end portion of the main frame and extending downward, and the main frame;
    a sub-battery that can supply electric power to the electric motor instead of the main battery is disposed in a second space (S2) that is surrounded by a seat rail connected to a rear portion of the main frame to support an occupant seat and the main frame; and
    the electric motor is disposed at a position different from the first and second spaces (S1 and S2),
    wherein a front end portion of a swing arm with the rear wheel journaled to a rear end portion of the swing arm is connected swingably up/down to the pivot frame, and the electric motor is disposed, with a rotational axis of the electric motor arranged coaxially with the rear wheel, at the rear end portion of the swing arm.

2. The saddle-ride electric vehicle according to claim 1,
    wherein a plurality of cells for the main battery, which are combined with each other to form the main battery, are aligningly arranged in a main battery box having an upper surface substantially corresponding to the main frame and being disposed in the first space (S1), wherein the first space (S1) corresponds to a shape of the main battery box; and
    a plurality of cells for the sub-battery, which are combined with each other to form the sub-battery, are aligningly arranged in a sub-battery box formed to correspond to the second space and being disposed in the second space, wherein the second space (S2) corresponds to a shape of the sub-battery box.

3. The saddle-ride electric vehicle according to claim 2,
    wherein a lower frame, which is movable between a connection state that connects the down frame with the pivot frame and a disconnection state that allows the main battery box to be drawn out downward by cutting the connection, is disposed between lower portions of the down frame and the pivot frame.

4. The saddle-ride electric vehicle according to claim 1,
    wherein a first cooling fan that sucks air heated by the main battery to a rear side of the first space and discharges the air rearward of the occupant seat is supported by a vehicle body frame having the head pipe, the main frame, the down frame and the pivot frame.

5. The saddle-ride electric vehicle according to claim 4,
    wherein the main battery box, which is formed such that traveling air coming from a front area of the vehicle can be introduced from the front and discharged from a rear upper portion, is disposed in the first space (S1); and
    the main battery is accommodated in a main battery box.

6. The saddle-ride electric vehicle according to claim 4,
    wherein a second cooling fan that sucks air heated by the sub-battery from the second space (S2) and discharges the air rearward of the occupant seat is supported by the vehicle body frame.

7. The saddle-ride electric vehicle according to claim 1,
wherein the down frame and the pivot frame are substantially parallel to each other.

8. A saddle-ride electric vehicle comprising:
    a head pipe steerably supporting a front fork with a front wheel journaled to a lower end portion of the front fork and a steering handlebar;
    a main frame extending downward and rearward from the head pipe; and
    an electric motor generating power for rotatively driving a rear wheel,
    wherein a main battery supplying electric power to the electric motor is disposed in a first space (S1) that is surrounded by a down frame connected to the head pipe and extending downward, a pivot frame connected to a rear end portion of the main frame and extending downward, and the main frame;
    a sub-battery that can supply electric power to the electric motor instead of the main battery is disposed in a second space (S2) that is surrounded by a seat rail connected to a rear portion of the main frame to support an occupant seat and the main frame;
    the electric motor is disposed at a position different from the first and second spaces (S1 and S2), and
    the main battery is removable from a lower side of the first space (S1), and
    wherein a plurality of cells for the main battery, which are combined with each other to form the main battery, are aligningly arranged in a main battery box having an upper surface substantially corresponding to the main frame and being disposed in the first space (S1), wherein the first space (S1) corresponds to a shape of the main battery box; and
    a plurality of cells for the sub-battery, which are combined with each other to form the sub-battery, are aligningly arranged in a sub-battery box formed to correspond to the second space and being disposed in the second space, wherein the second space (S2) corresponds to a shape of the sub-battery box.

9. The saddle-ride electric vehicle according to claim 8,
    wherein a front end portion of a swing arm with the rear wheel journaled to a rear end portion of the swing arm is connected swingably up/down to the pivot frame, and the electric motor is disposed, with a rotational axis of the electric motor arranged coaxially with the rear wheel, the rear end portion of the swing arm.

10. The saddle-ride electric vehicle according to claim 9, wherein a plurality of cells for the main battery, which are combined with each other to form the main battery, are aligningly arranged in a main battery box having an upper surface substantially corresponding to the main frame and disposed in the first space (S1), wherein the first space (S1) corresponds to a shape of the main battery box; and a plurality of cells for the sub-battery, which are combined with each other to form the sub-battery, are aligningly arranged in a sub-battery box formed to correspond to the second space and disposed in the second space, wherein the second space (S2) corresponds to a shape of the sub-battery box.

11. The saddle-ride electric vehicle according to claim 10, wherein a lower frame, which is movable between a connection state that connects the down frame with the pivot frame and a disconnection state that allows the main battery box to be drawn out downward by cutting the connection, is disposed between lower portions of the down frame and the pivot frame.

12. The saddle-ride electric vehicle according to claim 8, wherein a first cooling fan that sucks air heated by the main battery to a rear side of the first space and discharges the air rearward of the occupant seat is supported by a vehicle body frame having the head pipe, the main frame, the down frame and the pivot frame.

13. The saddle-ride electric vehicle according to claim 12, wherein the main battery box, which is formed such that traveling air coming from a front area of the vehicle can be introduced from the front and discharged from a rear upper portion, is disposed in the first space (S1); and the main battery is accommodated in a main battery box.

14. The saddle-ride electric vehicle according to claim 12, wherein a second cooling fan that sucks air heated by the sub-battery from the second space (S2) and discharges the air rearward of the occupant seat is supported by the vehicle body frame.

15. The saddle-ride electric vehicle according to claim 8, wherein the main battery includes a plurality of cells arranged in multiple stacks having different heights.

16. A saddle-ride electric vehicle comprising:
a head pipe steerably supporting a front fork with a front wheel journaled to a lower end portion of the front fork and a steering handlebar;
a main frame extending downward and rearward from the head pipe; and
an electric motor generating power for rotatively driving a rear wheel,
wherein a main battery supplying electric power to the electric motor is disposed in a first space (S1) that is surrounded by a down frame connected to the head pipe and extending downward, a pivot frame connected to a rear end portion of the main frame and extending downward, and the main frame;
a sub-battery that can supply electric power to the electric motor instead of the main battery is disposed in a second space (S2) that is surrounded by a seat rail connected to a rear portion of the main frame to support an occupant seat and the main frame;
the electric motor is disposed at a position different from the first and second spaces (S1 and S2), and
the main battery is removable from a lower side of the first space (S1)
wherein a first cooling fan that sucks air heated by the main battery to a rear side of the first space and discharges the air rearward of the occupant seat is supported by a vehicle body
frame having the head pipe, the main frame, the down frame and the pivot frame.

* * * * *